United States Patent [19]

Djega-Mariadassou et al.

[11] Patent Number: 4,894,185
[45] Date of Patent: Jan. 16, 1990

[54] COPRECIPITATION METHOD FOR THE MANUFACTURE OF ZINC OXIDE BASED DOPED POWDERS

[75] Inventors: Gërald Djega-Mariadassou, Igny, France; Vinh H. Tran, Bruxelles Belgique, Belgium; Monique Bureau Tardy, Paris; Alain Lagrange, Marsannay La Cote, both of France

[73] Assignee: Compagnie Europeenne De Compasants Electroniques LCC, Courbevoie, France

[21] Appl. No.: 126,853

[22] Filed: Nov. 30, 1987

[30] Foreign Application Priority Data

Dec. 2, 1986 [FR] France ................................ 8616803

[51] Int. Cl.$^4$ ............................................... H01C 7/10
[52] U.S. Cl. ..................................... 252/519; 252/518
[58] Field of Search ...................... 423/622; 75/0.5 A; 252/519, 518; 264/61

[56] References Cited

U.S. PATENT DOCUMENTS

| | | | |
|---|---|---|---|
| 4,540,971 | 9/1985 | Kanai et al. | 252/518 |
| 4,575,440 | 3/1986 | Palilla | 252/518 |
| 4,681,717 | 7/1987 | Brooks et al. | 252/518 |

FOREIGN PATENT DOCUMENTS 0097923  11/1984  European Pat. Off. .

OTHER PUBLICATIONS

Chemical Abstracts, vol. 105, No. 10, Sep. 1986, p. 167, Resume No. 81724a, Columbus, Ohio, US; & JP-A-6186421 (Sumitomo Aluminium Smelting Co.,) 1/5/86.
Boikess et al., "Chemical Principles", 2nd Ed., pp. 518-520 (Harper & Row, Publishers, New York).

*Primary Examiner*—Jack Cooper
*Attorney, Agent, or Firm*—Oblon, Spivak, McClelland, Maier & Neustadt

[57] ABSTRACT

A method for manufacturing a zinc oxide based powder by coprecipitation with one or more additions is disclosed. The method comprises:
 a step for the preparation of one or more solutions by dissolving defined quantities of salts of elements that go into the composition of the powder: zinc and addition(s),
 a step for the preparation of a buffer solution presaturated by the said elements, the said buffer solution possessing a pH which is defined so as to cause the precipitation of the hydroxylated compounds of elements corresponding to the elements saturating the buffer solution,
 a step during which the solutions are added to the said buffer solution, the drop in the pH being compensated for by the addition of a base and the volume of the buffer solution being kept constant by drawing off excess liquid,
 a step during which the precipitate obtained is treated to obtain the said powder.

16 Claims, 2 Drawing Sheets

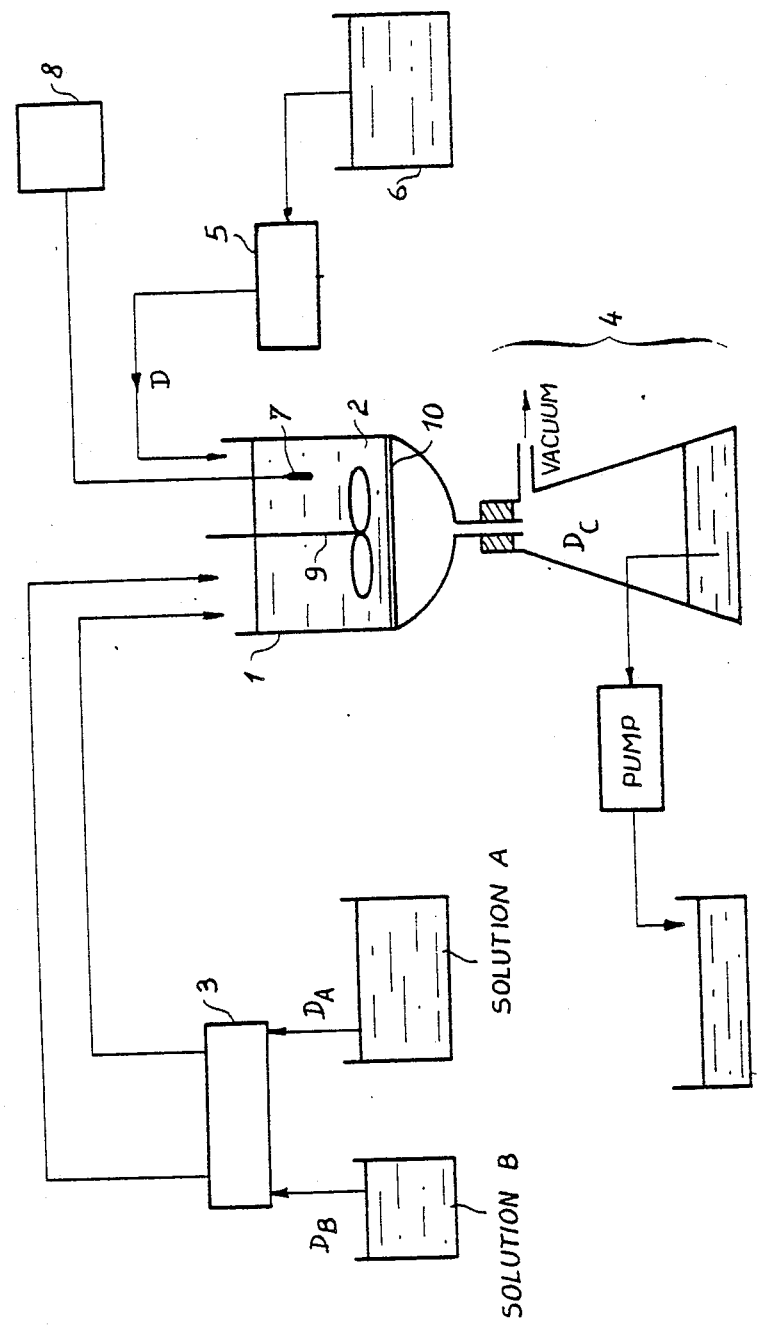
FIG_1

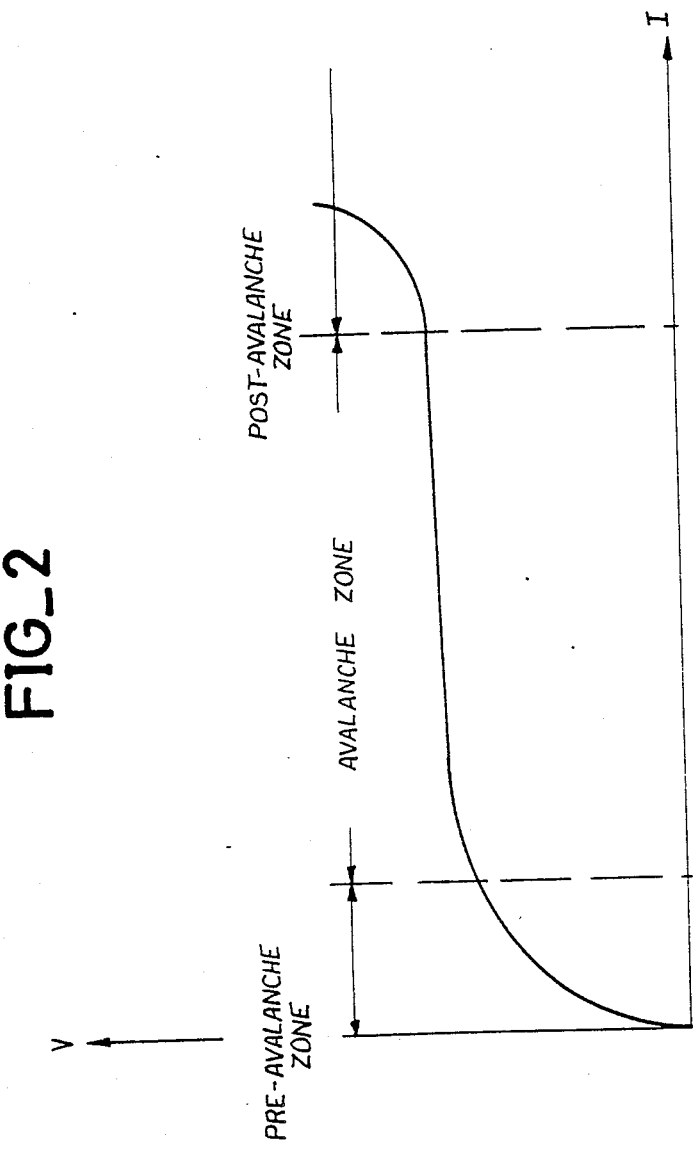

COPRECIPITATION METHOD FOR THE MANUFACTURE OF ZINC OXIDE BASED DOPED POWDERS

BACKGROUND OF THE INVENTION

1. Field of the Invention

The invention pertains to a method for the manufacture, by coprecipitation, of zinc oxide based powders intended especially for making varistors.

2. Description of the Prior Art

Various prior art methods exist for the manufacture of zinc oxide based powders used to make varistors. One of these methods consists in mixing defined proportions of powdered oxides or salts of the elements (zinc, bismuth, antimony, cobalt, manganese, etc.) of which the varistor will be composed. The mix is then homogenized as intimately as possible, then compressed and fritted. This mechanical method does not give very fine-grained dopes as compared with zinc oxide and the homogeneity of the powder is affected by it. Chemical methods give more homogeneous mixes on the microscopic scale. By precipitation or separate partial coprecipitation, precursor salts dissolved in various solutions can be used to give hydroxides which, when further mixed and subjected to heat treatment, give powders. The homogeneity of the powders may be greater than that of powders obtained by the direct mechanical mixing of oxides. However, the electrical characteristics of the varistors prepared with these powders show that these methods are still inadequate in terms of the homogeneity and reproducibility of the products obtained. A high level of homogeneity in the powders would give a better distribution of the potential barriers at grain boundaries as well as greater reproducibility.

The invention proposes to achieve these aims by the simultaneous precipitation of all the elements which are to form the powder, with a composition which is defined at any instant of the coprecipitation process. The method proposed includes the addition of elements with a given overall composition to a pre-saturated solution of all these elements.

This pre-saturated solution is buffered at a specified pH and the total buffer concentration is monitored. The pH is calculated and kept constant throughout the coprecipitation. This can be obtained by keeping the total buffer concentration of the saturated solution constant throughout the coprecipitation operation, and also keeping the total volume of this solution constant.

SUMMARY OF THE INVENTION

An object of the invention therefore, is a method for manufacturing, by coprecipitation, a zinc oxide based powder comprising one or more additions, the said method comprising the following steps:

first step: the preparation of one or more solutions by dissolving defined quantities of salts of elements that go into the composition of the powder: zinc and addition(s).

second step: the preparation of a buffer solution presaturated by the said elements, the said buffer solution possessing a pH which is defined so as to cause the precipitation of the hydroxylated compounds of elements corresponding to the elements saturating the buffer solution, third step: the addition of solutions prepared at the first stage to the said buffer solution, the drop in the pH being compensated for by the addition of a base and the volume of the buffer solution being kept constant by drawing off excess liquid, fourth step: the precipitate obtained during the third step is treated to obtain the said powder.

BRIEF DESCRIPTION OF THE DRAWINGS

The invention will be better understood and other advantages will emerge from the following description, given as a non-exhaustive example, and from the appended drawings, of which:

FIG. 1 illustrates the method for manufacturing powders according to the invention, FIG. 2 is a voltage/current diagram of a varistor.

DESCRIPTION OF PREFERRED EMBODIMENTS

When Zn(II) (the element zinc as a constituent element of a precursor salt) is added to an aqueous solution, water which is the main reagent of the coprecipitation method is decomposed according to the reaction:

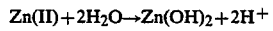

$$Zn(II) + 2H_2O \rightarrow Zn(OH)_2 + 2H^+$$

A zinc hydroxide precipitate is observed if the solubility product is attained, and two protons are created which modify the overall pH of the solution. It is known 10 that the physical/chemical characteristics of hydroxide depend on the pH. The invention, therefore, proposes to stabilize the pH of the precipitation medium to neutralize the protons which are created there. The precipitation medium will therefore be an aqueous solution of a buffer mixture into which will be poured the solution containing Zn(II). It is advantageous to choose a buffer mixture $NH_3/NH_4^+$. The pH must be adjusted and the buffer capacity of the ammonia solution must be made use of. If the pH of the buffer mixture is not too far from the value 9.2, this buffer capacity leads to a small variation in pH for a relatively big variation in the concentrations of $NH_3$ and $NH_4^+$.

The reasoning presented below for zinc remains valid for all additions such as cobalt, manganese, nickel, chromium etc.

To avoid an excessively rapid variation in the pH during the coprecipitation process, the total buffer concentration of the solution should be fairly higher than the concentrations of elements to be precipitated in the aqueous solution added. For ammonia, a total ammonia concentration of 1M is especially advantageous.

The pH of the buffer solution can be corrected in several ways. A strong base such as caustic soda NaOH or caustic potash KOH may be added. It is also possible to add ammonia $NH_3$ if the elements Na and K should not be used because it is difficult to remove them from the final powder. This is especially the case with powders intended for varistors in which these elements Na and K may be harmful. The addition of highly concentrated $NH_3$ prevents the coprecipitation of hydroxides by complexing effect. Preference will be given to the most basic possible solution of $NH_3$, with a molarity of 1M (i.e. with the least amount of ammonium ions $NH_4^+$ possible) and with a pH close to 11.

The cation $NH_3$ is a ligand for the elements Zn, Ni, Co, Mn and for other possible additions. This complexing process enters into competition with that of the hydroxyl ions, which constitute another ligand of cations. In the case of zinc, for example, when ammonia is absent, the $OH^-$ ions complex $Zn^{2+}$ significantly for a pH of more than 9 and may lead to a precipitation of hydroxide. However, in the presence of ammonia, the complexing of zinc by this ligand may keep Zn in solution. This complexing process depends on the $NH_3$ concentration and the $OH^-$ concentration, and therefore depends on the pH. It is therefore necessary to choose a pH value and an $NH_3$ concentration of the buffer solution which gives the optimum, simultaneous precipitation of all the cations used. The choice of the optimum pH is deduced from the variation in the conditional solubility of the elements, depending on the pH, for defined concentration levels of ammonia.

Among the dopes to be introduced, bismuth, lead and antimony for example, undergo hydrolysis (the immediate precipitation of hydroxides in aqueous phase) such that they have to be complexed in order to be put into solution before they are coprecipitated. The element Bi can be complexed by $Cl^-$ or $NO_3^-$; the element Pb can be complexed by $NO_3^-$. The element Sb can be complexed by the tartrate ion which leads to introducing $K^+$ ions in small quantities.

As will be seen further below, it is preferable to introduce the zinc and most of the dopes in the form of nitrates. In this case, after coprecipitation, the mixed solid retains a great deal of ammonium nitrate if an ammonia-based buffer mixture is used. This ammonium nitrate is easily eliminated by washing with water followed by drying and calcination.

APPLICATION OF THE METHOD

The method of the invention for manufacturing zinc oxide based powders comprises the following steps:

the dissolving, in water, of a defined quantity of salts of the elements which will enter into the composition of the powder, to form a solution A. For example, depending on the dopes required, zinc may be introduced in the form of nitrate or chloride, antimony in the form of potassium antimonyl tartrate, cobalt in the form of nitrate, manganese in the form of nitrate or chloride, nickel, chromium and aluminum in the form of nitrates.

if it is sought to introduce the element bismuth or the element lead, the dissolving of a defined quantity of a bismuth salt or a lead salt in a solution of nitric acid (1M for example) to form a solution B. The bismuth and lead salts may be nitrates.

the addition, at a constant rate, of the solution A and the solution B, if need be, to a given volume of buffer kept at a defined pH, leading to the precipitation of the hydroxides. Since each element to be precipitated has its own precipitation pH, the buffer solution is saturated beforehand with these elements using, for example, the same salts as those used to prepare the solutions A and B. This saturation immediately gives a precipitate with a composition laid down from the very beginning of the preparation. This composition is ensured throughout the precipitation stage.

the fall of the pH in the reactive medium is compensated for by the continuous addition of a base.

the volume of buffer is kept constant by drawing off excess liquid to maintain the saturation of the buffer solution.

the precipitate obtained is filtered, washed, dried and calcinated in air to obtain the final oxide.

According to the method of the invention, it is preferred to reduce the number of initial solutions (solutions A and B) to the minimum but it is possible to envisage as many solutions as there are elements that go into the composition of the powder.

The monitoring of the pH, its readjustment and the operation to keep the volume of buffer constant may be entirely automated through a system of pumps. The measuring of the pH may be recorded to enable the constant monitoring of this parameter.

OBTAINING A POWDER I

The conditions are the following:
pH of precipitation: 8
volume of ammonia buffer: 1800 ml for a total ammonia concentration of 1M.
base used for the correction of pH: $NH_3$ with a molarity of 1M for a pH of 11.

The solution A comprises the following in 300 ml of water:
220 g of zinc nitrate $Zn(NO_3)_2.6H_2O$.
4.6 g. of potassium antimonyl tartrate $K(SbO)C_4H_4O_6.1/2H_2O$.
2 g. of cobalt nitrate $Co(NO_3)_2.6H_2O$.
1 g. of nickel nitrate $Ni(NO_3)_2.6H_2O$.
2.2 g. of chromium nitrate $Cr(NO_3)_3.9H_2O$.
1.36 g. of manganese nitrate $Mn(NO_3)_2.4H_2O$.

The solution B has 4.6 g. of bismuth nitrate $Bi(NO_3)_3.5H_2O$ in 110 cm$^3$ of nitric acid with a molarity of 1.5M.

The buffer solution is pre-saturated by the cations of the elements to be precipitated except by bismuth and antimony cations since these elements precipitate almost instantaneously.

FIG. 1 illustrates the manufacturing method. In a big four-liter fritted glass container 1, provided with a mixer 9, 1.8 liters of ammonia buffer solution 2 with a pH 8 is introduced. This solution is saturated with Zn, Co, Ni, Cr, and Mn cations. The solutions A and B are added at respective flowrates $D_A$ and $D_B$ to the buffer solution 2 by means of a multiple-channel peristaltic pump 3. The excess liquid in the fritted glass container 1 is drawn off at a flowrate $D_C$ by means of a vacuum device which has the general reference 4. The pH of the reactive medium, read by an electrode 7 connected to a pH meter 8, is kept constant by adding ammonia 1M with a pH 11 drawn off at a flowrate D from a tank 6 by another peristaltic pump 5. These flowrates are set in such a way that:

$$D_C = D_A + D_B + D$$

For example, we might have:
$D_C = 25.2$ cm$^3$/min.
$D_A = 3.8$ cm$^3$/min.
$D_B = 1$ cm$^3$/min
$D = 20.4$ cm$^3$/min The precipitate obtained is collected at the filter 10 then vacuum filtered and washed with two liters of distilled water to eliminate unwanted soluble ions. It is then dried, first at ambient temperature for 24 hours, then in an oven at 120° C. for 8 hours. The product recovered is crushed and then calcinated in air at 700° C. with a heating rate of 2° C./min. It is kept at this temperature for the time needed to transform the hydroxides into oxides. Slow cooling in air ends the preparation process.

OBTAINING THE POWDERS Ia AND Ib

The conditions in which these powders and their compositions are obtained are exactly the same as for the powder I. These powders have been prepared in order to assess the reproducibility of the compositions using the method according to the invention.

OBTAINING A POWDER II

The procedure and quantities are identical to those stated above but the precipitate obtained undergoes a "ripening" process in a buffer solution for 72 hours before being filtered, dried and calcinated.

OBTAINING THE POWDERS III AND IIIa

The procedure is the same as above. The proportion of additions already mentioned is also the same, but small quantities of two more elements, aluminum and lead, are added. Aluminum is introduced in the form of nitrate into the solution A. The lead too is introduced in the form of nitrate, but into the solution B. The buffer solution is also pre-saturated by these elements.

Table 1, given at the end of the description, describes the composition of the above powders which may be compared to the theoretical rated composition. The proportions of elements other than zinc in the powders are given in moles of each element for 100 g. of powder. The chemical analysis of the powders was done by atomic absorption after dissolving the powder in acid medium.

Tables 2, 3 and 4, given at the end of the description, give the main physical and electrical characteristics (according to the fritting conditions) of the powders for which the obtaining method has been described above. The powders marked were fritted in the following conditions: temperature rise 200° C./h., plateau at 1190° C. for one hour, temperature drop at a rate of 200° C./h. The powder marked b was fritted in the following conditions: temperature rise 200° C./h, plateau at 1250° C. for one hour, temperature drop at a rate of 200° C./h. The powder b' differs from the b in its plateau temperature which is about 1200° C. The powder marked was fritted in the following conditions: temperature rise 200° C./h, plateau at 1200° C. for 1 h, temperature drop at a rate of 70° C./h.

Table 2 gives the specific surface area values $S_{BET}$ of the powders in m²/g as well as the density of the heat-treated powders.

Table 3 describes the behaviour under voltage of the varistors prepared with the above powders. The general shape of the voltage/current characteristic curve of a varistor is shown in FIG. 2. The curve of this diagram has three parts indicated in FIG. 2. $V_o$ (table 3) shows the direct voltage per mm. of varistor thickness for 1 mA of current flowing through it. The other columns of table 3 pertain to variations in voltage as a function of current variations. The ratio $V_{1mA}/V_{10\mu A}$ characterizes the leakage current level. The ratio $V_{10A}/V_{1mA}$ characterizes the peak clipping level at 10 A. The values are given according to the nature of the conducting deposit on the surfaces of the varistors to form electrodes. This deposit may be an alloy of indium and gallium or a silver-based compound. In the latter case, the compound may contain 70% of silver, the remainder being made up of a mineral flux and organic carriers. The compound is then deposited on the ceramic pieces coming from the fritting process, and the entire unit is treated at 620° C. in a through-type furnace in the following conditions: total cycle duration of about 35 min., plateau of about 3 min. at 620° C. The values shown in table 3 are mean values of readings for several samples.

Table 4 characterizes the resistance to current shocks. The values indicated are mean values of readings for several samples. The ratio $V_{100A}/V_{1mA}$ characterizes the peak-clipping level corresponding to a transient current of 100 A. The measurements are made by means of a wave of current of the type 8×20 μs. $\Delta V/V_{1mA}$ represents in percentage the relative drift of $V_{1mA}$ after a current shock I corresponding to the voltage V.

TABLE 1

| Powder | COMPOSITION (moles of element/100 g of powder) × 10³ | | | | | | | |
|---|---|---|---|---|---|---|---|---|
| | Bi | Sb | Co | Mn | Ni | Cr | Al | Pb |
| Theoretical composition | 16 | 23 | 12 | 9 | 6 | 9 | | |
| I | 16 | 23 | 9 | 8 | 6 | 10 | — | — |
| Ia | 16 | 22 | 11 | 9 | 6 | 9 | — | — |
| Ib | 16 | 22 | 10 | 8 | 6 | 9 | — | — |
| II | 12 | .21 | 7 | 13 | 6 | 9 | — | — |
| III | 16 | 22 | 11 | 9 | 6 | 9 | 0,04 | 0,06 |
| IIa | 16 | 22 | 11 | 9 | 6 | 9 | 0,04 | 0,06 |

| Powder | | $S_{BET}$ | Density |
|---|---|---|---|
| | a | 8 | 5,27 |
| I | b' | 8 | 5,26 |
| | c | 8 | 5,24 |
| | a | — | 5,30 |
| Ia | b | — | 5,28 |
| | c | — | 5,27 |
| | a | — | 5,23 |
| Ib | b | — | 5,29 |
| | c | — | 5,25 |
| II | a | 7,5 | 5,12 |
| | b | 7,5 | 5,07 |
| | a | — | 5,32 |
| III | b | — | 5,30 |
| | c | — | 5,30 |
| | a | — | 5,28 |
| IIIa | b | — | 5,27 |
| | c | — | 5,26 |

| Powder | | $V_o$ (V/mm) | | $V_{1mA}/V_{10\mu A}$ | | $V_{10A}/V_{1mA}$ | |
|---|---|---|---|---|---|---|---|
| | | In-Ga | Ag | In-Ga | Ag | In-Ga | Ag |
| | a | 216 | 214 | 1,08 | 1,09 | 1,60 | 1,60 |
| I | b' | 226 | 211 | 1,08 | 1,09 | 1,66 | 1,59 |
| | c | 208 | 207 | 1,08 | 1,11 | 1,66 | 1,63 |
| | a | 210 | 209 | 1,08 | 1,085 | 1,42 | 1,43 |
| Ia | b | 219 | 209 | 1,075 | 1,075 | 1,41 | 1,41 |
| | c | 211 | 206 | 1,075 | 1,07 | 1,42 | 1,42 |
| | a | 234 | 228 | 1,08 | 1,085 | 1,52 | 1,46 |
| Ib | b | 240 | 237 | 1,08 | 1,085 | 1,51 | 1,48 |
| | c | 228 | 228 | 1,08 | 1,085 | 1,57 | 1,56 |
| II | a | 220 | 228 | 1,09 | 1,08 | 1,59 | 1,58 |
| | b | 195 | 188 | ,09 | 1,09 | 1,71 | 1,68 |
| | a | 282 | 275 | 1,07 | 1,065 | 1,39 | 1,39 |
| III | b | 283 | 289 | 1,22 | 1,065 | 1,40 | 1,40 |
| | c | 279 | 279 | 1,07 | 1,065 | 1,40 | 1,42 |
| | a | 265 | 259 | 1,07 | 1,06 | 1,44 | 1,38 |
| IIIa | b | 277 | 266 | 1,07 | 1,06 | 1,40 | 1,38 |
| | c | 264 | 253 | 1,07 | 1,07 | 1,42 | 1,39 |

| Powder | | $V_{100A}/V_{1mA}$ | I (A) | V (V) | $\Delta V/V_{1mA}$ (%) |
|---|---|---|---|---|---|
| | a | 2,17 | 725 | 1000 | 9,3 |
| I | b' | 2,13 | 845 | 900 | 10,1 |
| | c | 2,23 | 725 | 960 | 7,1 |
| | a | 1,73 | 1090 | 685 | 15,3 |
| Ia | b | 1,72 | 1070 | 695 | 17,3 |
| | c | 1,75 | 1060 | 684 | 11,5 |
| | a | 1,86 | 925 | 850 | 4,6 |
| Ib | b | 1,89 | 855 | 890 | 3,8 |

-continued

| Powder | | $V_{100A}/V_{1mA}$ | I (A) | V (V) | $\Delta V/V_{1mA}$ (%) |
|---|---|---|---|---|---|
| | c | 2,00 | 745 | 985 | 3,4 |
| II | a | 2,04 | 822 | 920 | 16 |
| | b | 2,34 | 795 | 925 | 19 |
| | a | 1,54 | 1050 | 765 | 5,7 |
| III | b | 1,67 | 960 | 798 | 5,9 |
| | c | 1,70 | 972 | 780 | 4,8 |
| | a | 1,64 | 973 | 773 | 4,6 |
| | b | 1,63 | 996 | 757 | 3,8 |
| | c | 1,65 | 1020 | 747 | 3,4 |

What is claimed is:

1. A method of forming zinc oxide based doped powder, comprising:
    (a) preparing one or more aqueous solutions of soluble salts of zinc and at least one other metal element employing quantities of said zinc and metal elements sufficient to achieve a zinc oxide based powder in which zinc and said metal elements are present in the relative quantities desired;
    (b) separately preparing an aqueous buffer solution saturated with salts of each of the elements in the solutions prepared in step (a), and possessing a pH which is selected so as to cause precipitation of the hydroxylated compounds of said zinc and other metal elements in the solution of step (a);
    (c) adding the one or more prepared solutions of step (a) to the buffer solution of step (b), thereby forming a mixed solution and causing the precipitation of a mixed hydrated metal oxide product from the mixed solution, and compensating for any drop in pH in the mixed solution obtained by the addition of an appropriate amount of base while maintaining the volume of the buffer solution constant by the withdrawal of the appropriate quantities of solution as the solutions of step (a) are added to the buffer solution; and
    (d) preparing a zinc oxide based doped powder from said precipitate by calcining it in air.

2. The method of claim 1, wherein the zinc oxide based doped powder of step (d) is obtained by sequential filtering of the precipitate, washing and drying the same and finally calcining the precipitate in air.

3. The method of claim 1, wherein the zinc salt is zinc nitrate or chloride.

4. The method of claim 1, wherein said other metal elements are those which are selected from the group consisting of antimony, cobalt, manganese, nickel, chromium, bismuth, lead and aluminum.

5. The method of claim 4, wherein said antimony salt is potassium antimonyl tartrate.

6. The method of claim 4, wherein said cobalt salt is cobalt nitrate.

7. The method of claim 4, wherein said manganese salt is manganese nitrate or chloride.

8. The method of claim 4, wherein said nickel salt is nickel nitrate.

9. The method of claim 4, wherein said chromium salt is chromium nitrate.

10. The method of claim 4, wherein said bismuth salt is bismuth nitrate.

11. The method of claim 4, wherein said aluminum salt is aluminum nitrate.

12. The method of claim 4, wherein said lead salt is lead nitrate.

13. The method of claim 1, wherein a buffer mixture $NH_3/NH_4^+$ is present in said buffer solution.

14. The method of claim 13, wherein said base which is added to the buffer solution is ammonia.

15. The method of claim 13, wherein in step (a), said one or more aqueous solutions are a first aqueous solution of zinc nitrate, potassium antimony tartrate, cobalt nitrate, manganese nitrate, nickel nitrate and chromium nitrate, and a second aqueous solution prepared by dissolving a quantity of bismuth nitrate in nitric acid;
    wherein, in step (b), a $NH_3/NH_4^+$ buffered solution presaturated with salts of zinc and said at least one other metal element is prepared; and
    wherein, during step (c) the drop in pH of solution is compensated by the addition of ammonia to the mixed solution.

16. The method of claim 15, wherein in step (a), said first aqueous solution further has aluminum nitrate added thereto as a salt constituent, and wherein said second aqueous solution further contains lead introduced as lead nitrate into the solution, and wherein, the aqueous buffer solution of step (b) is pre-saturated with the salts of the solutions of step (a) and with aluminum and lead salts.

* * * * *

UNITED STATES PATENT AND TRADEMARK OFFICE
CERTIFICATE OF CORRECTION

PATENT NO. :  4,894,185
DATED      :  Jan. 16, 1990
INVENTOR(S) :  Gérald Djega-Mariadassou, et al It is certified that error appears in the above-identified patent and that said Letters Patent is hereby corrected as shown below:

On the title page:

The second inventor's name is incorrect, "Vinh H. Tran" should be:
   --Huu Vinh Tran--

Signed and Sealed this

Twelfth Day of March, 1991

Attest:

HARRY F. MANBECK, JR.

Attesting Officer    Commissioner of Patents and Trademarks